United States Patent Office 2,707,183
Patented Apr. 26, 1955

2,707,183
METALLIZABLE TRISAZO DYESTUFFS

Marcel Reding and Werner Bossard, Basel, Switzerland, assignors to J. R. Geigy A. G., Basel, Switzerland, a Swiss firm No Drawing. Application September 14, 1953, Serial No. 380,128

Claims priority, application Switzerland October 16, 1952

8 Claims. (Cl. 260—173)

The present invention concerns the production of new, metallisable trisazo dyestuffs, the coppered cellulose dyeings of which have very good fastness properties. They dye cellulose material by the direct dyeing method in yellow-green to green shades which are not changed much by the coppering process. Very pure yellow-green or green coppered cellulose dyeings are obtained according to the composition of the dyestuff, some of which have such excellent fastness to washing that they withstand repeated soap washings. The dyestuffs according to this invention supplement the group of fast, copperable trisazo dyestuffs at a point of the spectrum where at present there are not sufficient dyestuffs to fulfill the high demands made upon them.

It has been found that valuable trisazo dyestuffs of the type $$\text{A}-\text{N}=\text{N}-\overset{\overset{\text{COOH}}{|}}{\text{CH}}-\overset{\overset{\text{acyl}}{|}}{\text{CO}}-\text{NH}-\text{B}-\text{N}=\text{N}-\text{D}-\text{N}=\text{N}-\text{E} \quad \text{(I)}$$

can be obtained, if a diazotised amino compound of the benzene series (A) containing a carboxyl group in the o-position to the diazo group, is coupled with a new middle component of the composition:

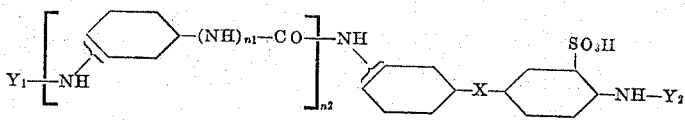

which is more fully described below, diazotizing the amino azo dyestuff so obtained and coupling the diazo compound in an acid medium with a 1-aminonaphthalene compound (D) coupling in the 4-position which contains a substituent suitable for the formation of the metal complex in the 2-position, in particular an alkoxy group. If desired, this can also be further substituted by a carboxyl group with advantage. The aminodisazo dyestuff so obtained is then diazotised and coupled in an alkaline medium with a 2-acylamino-6-hydroxynaphthalene-8-sulphonic acid (E).

In these middle components of the above Formula II containing the radical B, each of $n_1$ and $n_2$ represents an integer of the value of 0 or 1, X represents the direct carbon-to-carbon linkage or a CO—NH or an NH—CO—NH group, one of $Y_1$ and $Y_2$ represents hydrogen and the other represents an acyl-CH$_2$—CO group, wherein "acyl" means an alkoyl or a benzoyl radical. All the benzene rings in this formula as well as in all formulae derived therefrom can contain the non-ionogenic substituents usual in azo dyestuffs, for example, halogen, alkyl or alkoxy groups. So that the trisazo dyestuffs according to the present invention which are distinguished particularly by their pure yellow-green to green shades, will be obtained, it is necessary that in one of the benzene rings in the Formula II the substituents according to the definition, the position of which is not fixed, should be in the meta positions. The new middle components usable according to the present invention (corresponding to B) are monoprimary amino compounds which are derived from polynuclear, substantive diamino compounds of the diphenyl, diphenyl urea and bezanilide series having a sulphonic acid group standing in the o-position to an amino group and wherein an amino group is acyloacetylated and a benzene ring is meta-substituted as defined.

1.4-diaminobenzene-2-sulphonic acids, 4.4′-diaminodiphenyl-3-sulphonic acid, 4.4′-diaminodiphenyl urea-3-sulphonic acid and 4-(4′-aminobenzoylamino)-1-aminobenzene-2-sulphonic acids for example can be used as starting materials for the production of such middle components of the general (Formula II. They can be converted into mono-m-nitrobenzoyl- or mono-m-nitrophenylcarbamyl derivatives according to known methods with m-nitrobenzoyl halides or m-nitrophenyl isocyanates. The aqueous solution of their alkali salts is then treated at 40–60° C. with diketene until the primary amino groups have disappeared and the nitro groups are reduced to amino groups. In this manner, in the process according to this invention, particularly favorable middle components are obtained which contain an acetoacetylamino group in the o-position to the sulphonic acid group. It is also possible however, first to reduce the nitro group to the amino group and then treat the aqueous solution of the alkali salts in the cold with diketene, in which process only the amino group not in the neighboring position to the sulphonic acid group is acetoacetylated. Thus in the process according to the present invention, further usable middle components of the Formula II having a primary amino group in the neighboring position to the sulphonic acid group are obtained. Finally, also 3′-(p-nitrobenzoyl- or p-nitrophenylcarbamylamino)-4-aminodiphenyl urea-3-sulphonic acids or 4-[3′-(p-nitrobenzoyl- or p-nitrophenyl carbamylamino)-benzoylamino]-1-aminobenzene-2-sulphonic acids can either first be reduced and then treated with diketene in the cold, or in reverse, first treated in the warm with diketene and then the nitro group can be reduced to the amino group. In this way also middle components of the Formula II usable according to the present invention are obtained. Because of their easier accessibility and their better suitability for the building up of the trisazo dyestuffs according to the present invention, the dinuclear middle components of the Formula II ($n_2$=O) are to be preferred to the polynuclear. Middle components of the Formula II which contain the radical

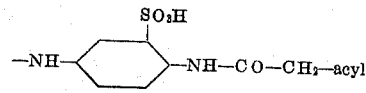

produce particularly valuable dyestuffs.

If diazotised 2-aminobenzene carboxylic acids are reacted in an alkaline medium with compounds of the Formula II, the coupling occurs in the acyloacetyl radical and metallizable amino-monoazo dyestuffs are obtained which can be further diazotised.

As starting components, those usual in metallizable azo dyestuffs can be used, namely 2-aminobenzene-1-carboxylic acids. These compounds can contain further substituents, e. g. halogen alkyl, alkoxy, carboxyl, sulphonic acid, sulphonic acid amide, sulphonic acid amide groups organically substituted at the nitrogen atom, alkyl sulphonyl, arylsulphonyl and acylamino groups.

2-alkoxy-1-aminonaphthalene compounds coupling in the 4-position can be used as the second coupling components D, e. g. 1-amino-2-methoxy- or ethoxy-naphthalene, 1-amino-2-naphthyl-glycolic acid and derivatives thereof sulphonated in the 6- or 7-position of the naphthalene ring. 1-amino-2-naphthyl-glycolic acid often has a favorable influence on the drawing power of the trisazo dyestuffs according to the present invention, and is therefore, to be preferred.

The 2-acylamino-6-hydroxynaphthalene - 8 - sulphonic acids used as end components E can contain as acyl radicals alkoyl radicals derived from lower fatty acids which can be further substituted, e. g. acetyl-, propionyl, butyryl, chloracetyl, 2-bromopropionyl, methoxyacetyl, dimethylacryl, succinyl radicals or aroyl radicals, preferably of the benzene series, e. g. benzoyl, 4- or 2-methyl- or chlorobenzoyl, 4- or 3-aminobenzoyl, 4- or 3-acetamido-benzoyl, 4-chloro or methoxy or methyl-3-aminobenzoyl, 4-methoxy- or ethoxybenzoyl radicals, further radicals of alicyclic or heterocyclic carboxylic acids as well as acyl radicals derived from carbonic acid such as carbamyl and carbalkoxy radicals, e. g. the dimethylcarbamyl or a phenylcarbamyl group or the carbethoxy, carbomethoxy, the carbomethoxy-ethoxy group. The final coupling is advantageously performed in an alkaline medium in the presence of tertiary organic bases, e. g. in the presence of pyridine and homologues thereof.

The trisazo dyestuffs of the invention can also be defined as corresponding to the formula

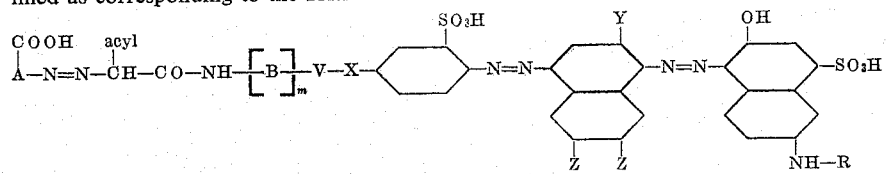

wherein A represents an aromatic radical of the benzene series containing the carboxyl group in the o-position to the azo linkage, B stands for the group

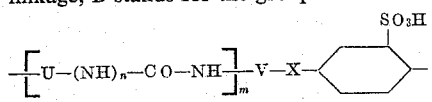

each of $n$ and $m$ is one of the numerals 0 and 1, each of U and V represents an aromatic radical of the benzene series, in one of which the bonds shown stand in the m-position and in the other the bonds shown stand in the p-position, both of which are free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH$_2$COOH groups, one Z represents hydrogen and the other Z represents a member selected from the group consisting of hydrogen and the sulphonic acid group and R represents a carboxylic acid acyl radical bound directly to the adjacent —NH— group by the —CO— group.

These dyestuffs include products of the formulae

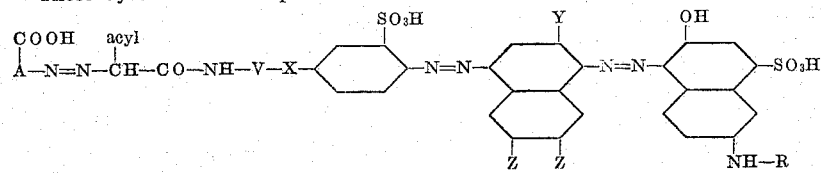

and

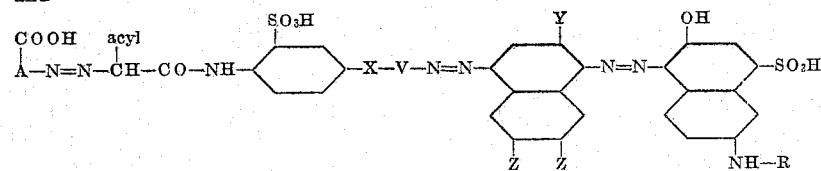

wherein A, acyl, X, Y, Z and R have the aforesaid significances, and V represents an aromatic radical of the benzene series in which the bonds shown stand in m-position of said aromatic radical and which is free from carboxylic acid and sulphonic acid groups.

In the form of their alkali salts, the new trisazo dyestuffs dissolve in hot water with a green color and they dye cellulose fibers direct from a dyebath containing Glauber's salts in yellow-green to green shades. The shade is only slightly altered on after-treating the cellulose dyeings with agents giving off copper; on the other hand the fastness to wet and light is considerably improved. The coppering process can be performed in a neutral to weakly acid medium in the dyebath or in a fresh bath with the usual copper salts such as e. g. copper acetate or copper sulphate. If desired, copper compounds can be used which are stable to alkali such as are obtained by reacting copper sulphate with sodium tartrate in a soda-alkaline bath.

The following examples illustrate the invention without limiting it in any way. Where not otherwise stated, parts are given as parts by weight and the temperatures are in degrees Centigrade. The relationship of parts by weight to parts by volume is as that of kilogrammes to litres.

*Example 1*

21.6 parts of 2-aminobenzoic acid-5-sulphonic acid amide are dissolved with 15 parts of concentrated hydrochloric acid in 200 parts of water and diazotised at 10° with 6.9 parts of sodium nitrite. The resulting solution is poured into a solution of 41 parts of 5-(3'-acetoacetylaminobenzoylamino) - 2 - aminobenzene - 1 - sulphonic acid in 400 parts of water and 24 parts of sodium bicarbonate. On completion of the coupling the yellow monoazo dyestuff is salted out and filtered off. The filter cake is dissolved in 1000 parts of water and 6.9 parts of sodium nitrite are added. A yellow diazo suspension is obtained by the dropwise addition of 40 parts of concentrated hydrochloric acid at 10–15°, which is made weakly acid to Congo red after stirring for 4 hours with 5 parts of sodium carbonate. It was then coupled with a solution of 21.7 parts of 1-amino-2-naphthylglycolic acid and 20 parts of sodium acetate. To accelerate the reaction, 4 parts of sodium carbonate are added to keep the reaction slightly acid. The disazo dyestuff formed is dissolved with 5 parts of caustic soda, mixed with 400 parts of sodium chloride, 60 parts of concentrated hydrochloric acid and diazotized with 8.2 parts of sodium nitrite at 20°. On completion of the diazotization, the diazo compound is filtered off and washed. It is then coupled with 34.3 parts of 2-benzoylamino-6-hydroxynaphthalene-8-sulphonic acid in 200 parts of water in the presence of 150 parts of pyridine and 20 parts of sodium carbonate.

The green trisazo dyestuff of the formula:

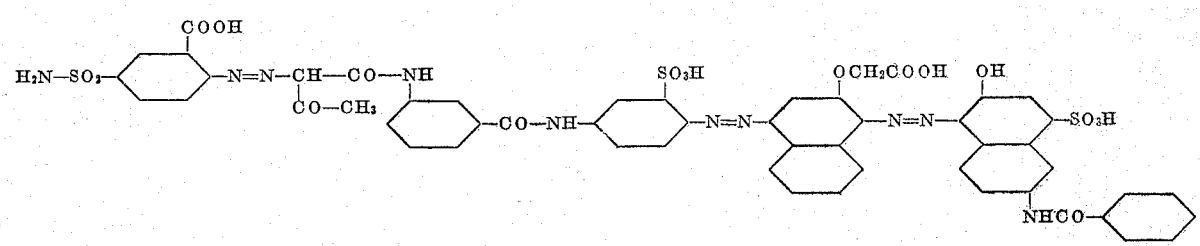

is precipitated with a little sodium chloride, filtered off and freed from adhering impurities by washing.

It is a dark powder which dissolves in water with a green and in concentrated sulphuric acid with an olive green color. It dyes fibres from natural or regenerated cellulose in vivid yellowish-green shades. The dyeings are made fast to light, washing and acid by after-treatment with copper salts.

If in this example 13.7 parts of 2-aminobenzoic acid, 19.4 parts of 4- or 5-acetylamino-2-aminobenzoic acid, 21 parts of 2-amino-1-carboxyphenyl-4- or -5-carbamic acid methyl ester, 22.4 parts of 2-amino-1-carboxyphenyl-4- or -5-carbamic acid ethyl ester, 25.4 parts of 2-amino-1-carboxyphenyl-4- or -5-carbamic acid methoxyethyl ester, 26.8 parts of 2-amino-1-carboxyphenyl-4- or -5-carbamic acid ethoxyethyl ester, 25.2 parts of 5-succinylamino-2-aminobenzoic acid, 18.1 parts of 2-aminobenzene-1.4- or 1.5-dicarboxylic acid, 21.7 parts of 2-aminobenzoic acid-4- or -5-sulphonic acid, 23 parts of 2-aminobenzoic acid-5-sulphonic acid methylamide, 24.4 parts of 2-aminobenzoic acid-5-sulphonic acid dimethyl amide, 2.6 parts of 2-aminobenzoic acid-5-sulphonic acid-β-oxethyl amide, 21.5 parts of 4- or 5-methylsulphonyl-2-aminobenzoic acid, 17.2 parts of 2-amino-4- or -5-chlorobenzoic acid, 20.6 parts of 2-amino-4.6-dichlorobenzoic acid or 15.1 parts of 2-amino-4-methylbenzoic acid are used instead of 21.6 parts of 2-aminobenzoic acid-5-sulphonic acid amide, analogous green trisazo dyestuffs are obtained which have similar properties.

*Example 2*

21.6 parts of 2-aminobenzoic acid-5-sulphonic acid amide are dissolved at 50° with 7.5 parts of sodium carbonate in 500 parts of water. 6.9 parts of sodium nitrite are added and the solution is poured at 0° onto 30 parts of concentrated hydrochloric acid. The diazonium solution is poured into 40.6 parts of 3'-acetoacetylamino-4-amino-1.1'-diphenyl urea-3-sulphonic acid in 400 parts of water and 24 parts of sodium bicarbonate. The yellow monoazo dyestuff is isolated, dissolved in 1000 parts of water and diazotized at 10–15° with 6.9 parts of sodium nitrite and 40 parts of concentrated hydrochloric acid. The diazonium compound neutralized with 4 parts of sodium carbonate is poured at 0–5° into a solution of 21.7 parts of 1-amino-2-naphthyl glycolic acid to which has been added 20 parts of sodium acetate.

If in this example the 21.6 parts of 2-aminobenzoic acid-5-sulphonic acid amide are replaced by 13.7 parts of 2-aminobenzoic acid, 19.4 parts of 4- or 5-acetylamino-2-aminobenzoic acid, 21 parts of 2-amino-1-carboxyphenyl-4- or -5-carbamic acid-methylester, 22.4 parts of 2-amino-1-carboxyphenyl-4- or -5-carbamic acid-ethylester or 25.4 parts of 2-amino-1-carboxyphenyl-4- or -5-carbamic acid methoxyethyl ester or 26.8 parts of 2-amino-1-carboxyphenyl-4- or -5-carbamic acid ethoxyethyl ester or 25.2 parts of 5-succinylamino-2-aminobenzoic acid or 18.1 parts of 2-aminobenzene-1,4- or -1.5-dicarboxylic acid, 21.7 parts of 2-aminobenzoic acid-4- or -5-sulphonic acid or 23 parts of 2-aminobenzoic acid-5-sulphonic acid methylamide or 24.4 parts of 2-aminobenzoic acid-5-sulphonic acid dimethylamide or 26 parts of 2-aminobenzoic acid-5-sulphonic acid-β-oxethylamide or 21.5 parts of 4- or 5-methylsulphonyl-2-aminobenzoic acid or 17.2 parts of 2-amino-4- or -5-chlorbenzoic acid or 20.6 parts of 2-amino-4.6-dichlorobenzoic acid or 15.1 parts of 2-amino-4-methylbenzoic acid, similar green trisazo dyestuffs with similar properties are obtained.

*Example 3*

19.4 parts of 2-amino-5-acetylaminobenzoic acid are dissolved at 40° in 120 parts of water with 6.4 parts of sodium carbonate, mixed with 6.9 parts of sodium nitrite and cooled with ice to 0°. 30 parts of concentrated hydrochloric acid are quickly added and the diazo suspension is coupled with 39.1 parts of 5-(3'-aminobenzoylamino)-2-acetoacetylaminobenzene-1-sulphonic acid and 30 parts of sodium carbonate in 400 parts of water. The monoazo dyestuff is isolated and diazotized as described in Example 1, and the neutralized diazonium compound is poured into the solution of 21.7 parts of 1-amino-2-naphthylglycolic acid and 20 parts of sodium acetate in 660 parts of water. The whole is stirred overnight, then the disazo dyestuff which forms is dissolved with 5 parts of caustic soda, converted into the sodium salt with 400 parts of sodium chloride and diazotized at 25° with 60 parts of hydrochloric acid and 8.2 parts of sodium nitrite. The diazonium compound formed is filtered off and coupled with 28.1 parts of 2-acetylamino-6-hydroxynaphthalene-8-sulphonic acid in 200 parts of water, 150 parts of pyridine and 20 parts of sodium carbonate. The trisazo dyestuff of the formula:

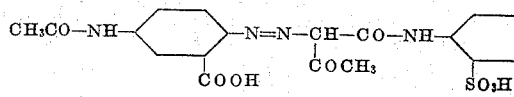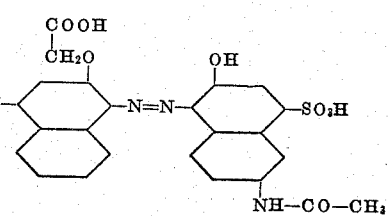

The reaction of the coupling is kept weakly acid by the addition of 5 parts of sodium carbonate. The violet disazo dyestuff dissolves with 5 parts of caustic soda and is further diazotized as described in Example 1. The isolated diazonium compound can be coupled with 34.8 parts of 6-hydroxynaphthyl-(2)-carbamic acid-methoxyethyl ester-8-sulphonic acid in 200 parts of water with the addition of 20 parts of sodium carbonate and 150 parts of pyridine to form the green trisazo dyestuff of the formula:

is isolated as described in Example 1 and when dry it is a dark powder which dissolves in water and in concentrated sulphuric acid with a green color. Cotton and staple rayon are dyed in green shades which do not change much on after-coppering and have excellent fastness properties.

If instead of 19.4 parts of 2-amino-5-acetylaminobenzoic acid, 13.7 parts of 2-aminobenzoic acid or the corresponding number of parts of another of the 2-amino-1-benzene carboxylic acids listed in Example 1 are used

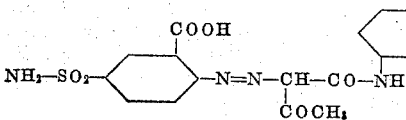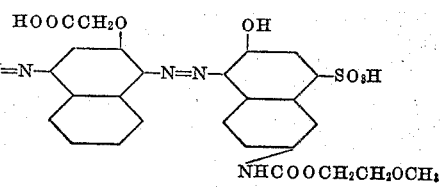

It is a dark powder which dissolves in water with a green and in concentrated sulphuric acid with an olive green color. It dyes cotton, rayon, viscose, hemp and jute in green shades. After treatment with copper compounds according to one of the usual methods, the dyeings have very good fastness properties.

and otherwise the procedure described above is followed, similar dyestuffs with similar properties are obtained.

*Example 4*

13.7 parts of 2-aminobenzoic acid are diazotized and coupled with 40.6 parts of 3'-amino-4-acetoacetylamino- 1.1'-diphenyl urea-3-sulphonic acid in 400 parts of water with the addition of 24 parts of sodium bicarbonate. The yellow monoazo dyestuff is isolated, dissolved and diazotized as described in Example 3. The neutralized diazonium compound is poured into a solution of 29.7 parts of 1-amino-2-naphthylglycolic acid-6-sulphonic acid and 20 parts of sodium acetate in 400 parts of water. The violet disazo dyestuff is diazotized with 60 parts of concentrated hydrochloric acid and 8.2 parts of sodium nitrite in the presence of sodium chloride, filtered and the diazonium compound is coupled with a soda alkaline solution of 34.3 parts of 2-benzoylamino-6-hydroxynaphthalene-8-sulphonic acid in 200 parts of water and 150 parts of pyridine to form the trisazo dyestuff of the formula:

stirring for 4 hours, the neutralized suspension is poured into a solution of 29.7 parts of 1-amino-2-naphthylglycolic acid-7-sulphonic acid to which has been added 20 parts of sodium acetate. The disazo dyestuff obtained is violet and, with the addition of 400 parts of sodium chloride, is further diazotized with 8.2 parts of sodium nitrite and 60 parts of concentrated hydrochloric acid. It is filtered off and finally coupled with an aqueous solution of 34.3 parts of 2-benzoylamino-6-hydroxynaphthalene-8-sulphonic acid, 20 parts of sodium carbonate and 150 parts of pyridine. The green trisazo dyestuff of the formula:

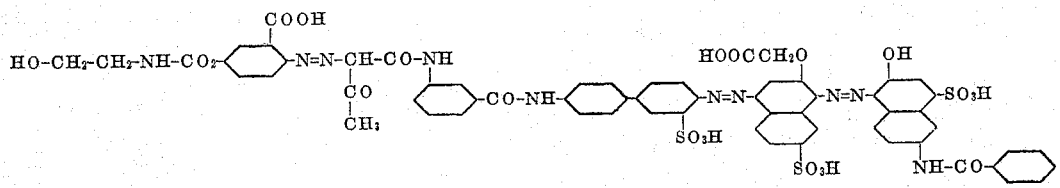

is precipitated with sodium chloride, filtered off and freed from impurities by washing. It is a dark powder which

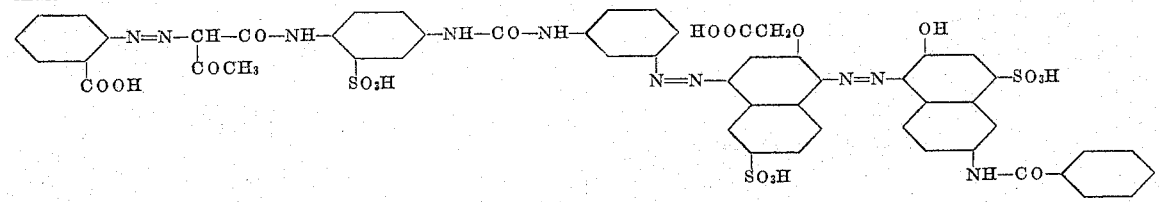

The dried dyestuff is a dark powder which dissolves in water and in concentrated sulphuric acid with a green color. It dyes natural and regenerated cellulose green. On after-treatment with copper salts, the fastness of the dyeings to light, washing and acid is increased.

Similar dyestuffs with similar properties are obtained if the 34.3 parts of 2-benzoylamino-6-hydroxynaphthalene-8-sulphonic acid are replaced by 35.8 parts of 2-(3'-aminobenzoylamino)-6-hydroxynaphthalene-8-sulphonic acid or 28.1 parts of 2-acetylamino-6-hydroxynaphthalene-8-sulphonic acid or 35.8 parts of 2-(4'-aminobenzoylamino)-6-hydroxynaphthalene-8-sulphonic acid or 39.3 parts of 2-(4'-chloro-3'-aminobenzoylamino)-6-hydroxynaphthalene-8-sulphonic acid or 37.9 parts of 2-(2'- or 4'-chlorobenzoylamino)-6-hydroxynaphthalene-8-sulphonic acid or 37.2 parts of 2-(4'-methyl-3'-aminobenzoyl)-6-hydroxynaphthalene-8-sulphonic acid or 38.8 parts of 2-(4'-methoxy-3'-aminobenzoylamino)-6-hydroxynaphthalene-8-sulphonic acid or 40 parts of 2-(3'-acetylaminobenzoylamino)-6-hydroxynaphthalene-8-sulphonic acid or 36.9 parts of 2-cinnamoylamino-6-hydroxynaphthalene-8-sulphonic acid or 33 parts of 2-furanoylamino-6-hydroxynaphthalene-8-sulphonic acid or 32.1 parts of 2-(β,β-dimethylacrylamino)-6-hydroxynaphthalene-8-sulphonic acid or 29.7 parts of 2-carbomethoxyamino-6-hydroxynaphthalene-8-sulphonic acid or 34.8 parts of 6'-hydroxynaphthyl-(2')-carbamic acid-methoxyethyl ester-8'-sulphonic acid or 31.1 parts of 2-carbethoxyamino-6-hydroxynaphthalene-8-sulphonic acid.

*Example 5*

46.7 parts of 4'-(3''-acetoacetylaminobenzoylamino)-4-aminodiphenyl-3-sulphonic acid are dissolved in 400 parts of water and 24 parts of sodium bicarbonate are added. The diazonium compound made up from 26 parts of 2-aminobenzoic acid-5-sulphonic acid-β-ethanolamide which has been prepared in the usual way is added to this solution. The yellow monoazo dyestuff obtained is precipitated with sodium chloride and filtered off. The filter cakes are dissolved in 1000 parts of water and diazotized according to the method described in Example 1. After dissolves in water with a green color and in concentrated sulphuric acid with a brown color.

After treatment with copper sulphate, the green dyeings obtained therewith on cellulose fibres have very good fastness properties.

If instead of 46.7 parts of 4'-(3''-acetoacetylaminobenzoylamino)-4-aminodiphenyl-3-sulphonic acid, 48.3 parts of 4'-(4''-acetoacetylamino-3''-methylbenzoylamino)-4-aminodiphenyl-3-sulphonic acid or 48.2 parts of 4'-(3''- or 4''-acetoacetylaminophenylureido)-4-aminodiphenyl-3-sulphonic acid are used, or if instead of the 26 parts of 2-aminobenzoic acid-5-sulphonic acid-β-ethanolamide equivalent parts of another of the 2-aminocarboxybenzene compounds listed in Example 1 are used, analogous dyestuffs with similar properties are obtained.

*Example 6*

21 parts of 2-amino-5-carbomethoxyaminobenzene-1-carboxylic acid are dissolved at 20° in 180 parts of water with 4.1 parts of caustic soda, mixed with 30 parts of concentrated hydrochloric acid and diazotised by the addition of 6.9 parts of sodium nitrite. The diazonium compound is coupled with 52.4 parts of 5-[4'-(3''-acetoacetylamino-4''-methylbenzoylamino)-benzoylamino]-2-aminobenzene-1-sulphonic acid in 600 parts of water and 30 parts of sodium carbonate to form a yellow monoazo dyestuff. After isolating this dyestuff, it is dissolved in 1000 parts of water and further diazotized with 6.9 parts of sodium nitrite and 40 parts of concentrated hydrochloric acid. The isolated diazonium compound is coupled with 25.3 parts of 1-amino-2-methoxynaphthalene-6-sulphonic acid in 200 parts of water in the presence of 20 parts of sodium acetate to form the violet disazo dyestuff. The reaction is made weakly acid with 5 parts of sodium carbonate to accelerate the reaction. The disazo dyestuff is diazotized according to the method given in Example 1. Finally, the isolated diazonium compound is coupled with a solution of 28.1 parts of 2-acetylamino-6-hydroxynaphthalene-8-sulphonic acid in 200 parts of water, 20 parts of sodium carbonate and 150 parts of pyridine to form the trisazo dyestuff of the formula:

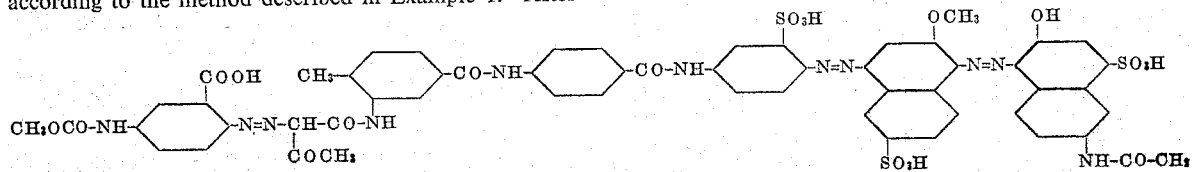

It is isolated with a little sodium chloride and when dry, it is a dark powder which dissolves in water with a green and in concentrated sulphuric acid with a yellowish-green color. The dyeings on cellulose fibres are green and on after-treating with copper salts, are fast to light, washing and acid.

If instead of 52.4 parts of 5-[4'-(3''-acetoacetylamino-4''-methylbenzoylamino) - benzoylamino] - 2 - aminobenzene-1-sulphonic acid, 51 parts of 5-[4'-(3''-acetoacetyl-aminobenzoylamino)-benzoylamino] - 2 - aminobenzene-1-sulphonic acid or 52.4 parts of 5-[3'-(3''-acetoacetyl-amino-4''-methylbenzoylamino)-benzoylamino]-2-aminobenzene-1-sulphonic acid or 52.5 parts of 4'-(3''-acetoacetylaminobenzoylamino)-4-amino - 1.1' - diphenyl urea-3-sulphonic acid or 52.5 parts of 5-[4'-(3''-acetoacetyl-aminophenylureido)-benzoylamino]-2-aminobenzene - 1 - sulphonic acid, 53.9 parts of 5-[4'-(3''-acetoacetylamino-4''-methylphenylureido) - benzoylamino] - 2 - aminobenzene-1-sulphonic acid or 45.3 parts of 5-(3'-aminobenzoyl-amino)-2-benzoylacetylaminobenzene - 1 - sulphonic acid or 46.7 parts of 5-(4'-amino-3'-methylbenzoylamino)-2-benzoylacetylaminobenzene-1-sulphonic acid are used, similar green trisazo dyestuffs with similar properties are obtained.

*Example 7*

13.7 parts of 2-aminobenzoic acid are diazotized as described in Example 4 and coupled with a soda alkaline solution of 40.6 parts of 3'-amino-4-acetoacetylamino-1.1'-diphenyl urea-3-sulphonic acid. The precipitated monoazo dyestuff is filtered off, dissolved in 1000 parts of water and diazotized at 10–15° with 6.9 parts of sodium nitrite and 40 parts of concentrated hydrochloric acid. After 4 hours, the diazonium compound is made weakly acid to Congo red with 5 parts of sodium carbonate and added to a solution of 21.7 parts of 1-amino-2-naphthaleneglycolic acid in 600 parts of water with the addition of 20 parts of sodium acetate. The whole is stirred overnight and then the violet disazo dyestuff which forms is further diazotized the next day. The dyestuff is isolated and coupled with 31.3 parts of 2-carbethoxyamino-6-hydroxynaphthalene-8-sulphonic acid in 200 parts of water, 150 parts of pyridine and 20 parts of sodium carbonate. After isolating and washing free from impurities, the trisazo dyestuff of the formula:

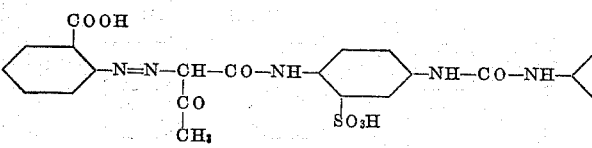

when dry is a dark powder which dissolves in water with a green and in concentrated sulphuric acid with a brown color. Natural or regenerated cellulose fibres are dyed green. On after-treating with copper salts, the dyeings are made fast to light, washing and acid.

If in this example the 13.7 parts of 2-aminobenzoic acid are replaced by the corresponding number of parts of another of the 2-aminobenzoic acids listed in Example 2, similar green dyestuffs with similar properties are obtained.

*Example 8*

1.5 parts of the dyestuff obtained according to Example 1 are dissolved in a dyebath containing 3000 parts of water and 2 parts of soda. 100 parts of cotton are entered at 40–50°, the bath is heated to 90–95° within 30 minutes, 30 parts of sodium sulphate are added and dyeing is performed for 45 minutes at this temperature. After this time, the dyed goods are rinsed cold and after-treated at 70° in a fresh bath with 2 parts of crystallised copper sulphate in 2000 parts of water and 2 parts of 30% acetic acid for half an hour. The goods are rinsed and dried in the usual way. The cotton is dyed in green shades which have excellent fastness properties.

What we claim is:

1. A trisazo dyestuff of the formula

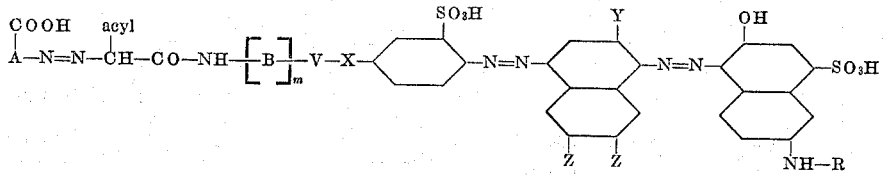

wherein A represents an aromatic radical of the benzene series containing the carboxyl group in the o-position to the azo linkage, B stands for the group

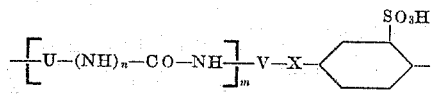

each of $n$ and $m$ is one of the numerals 0 and 1, each of U and V represents an aromatic radical of the benzene series, in one of which the bonds shown stand in the m-position and in the other the bonds shown stand in the p-position, both of which are free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group and R represents a carboxylic acid acyl radical bound directly to the adjacent —NH— group by the —CO— group.

2. A trisazo dyestuff of the formula

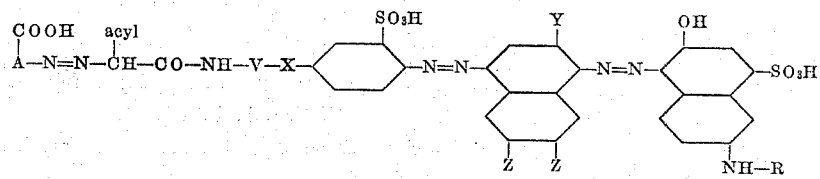

wherein A represents an aromatic radical of the benzene series containing the carboxyl group in the o-position to the azo linkage, V represents an aromatic radical of the benzene series in which the bonds shown stand in m-position of said aromatic radical and which is free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group and R represents a carboxylic acid acyl radical bound directly to the adjacent —NH— group by the —CO— group.

3. A trisazo dyestuff of the formula

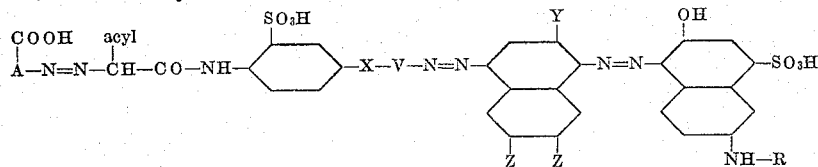

wherein A represents an aromatic radical of the benzene series containing the carboxyl group in the o-position to the azo linkage, V represents an aromatic radical of the benzene series in which the bonds shown stand in m-position of said aromatic radical and which is free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group and R represents a carboxylic acid acyl radical bound directly to the adjacent —NH— group by the —CO— group.

4. The trisazo dyestuff of the formula

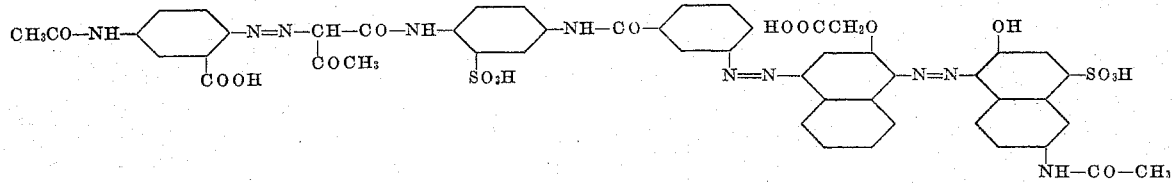

5. The trisazo dyestuff of the formula:

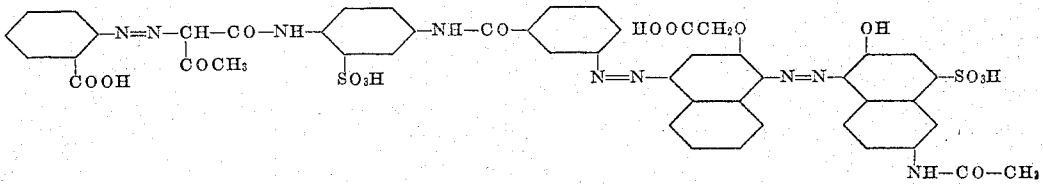

6. The trisazo dyestuff of the formula:

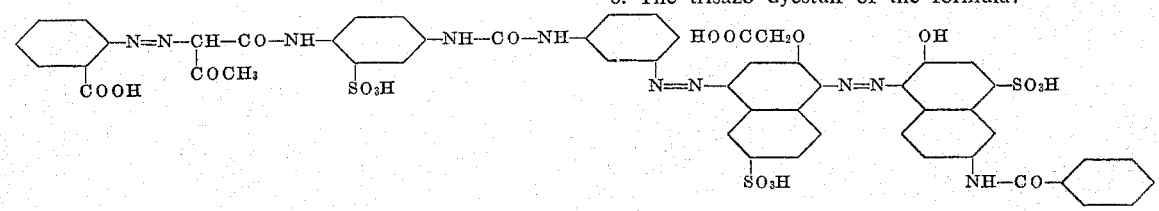

7. The trisazo dyestuff of the formula:

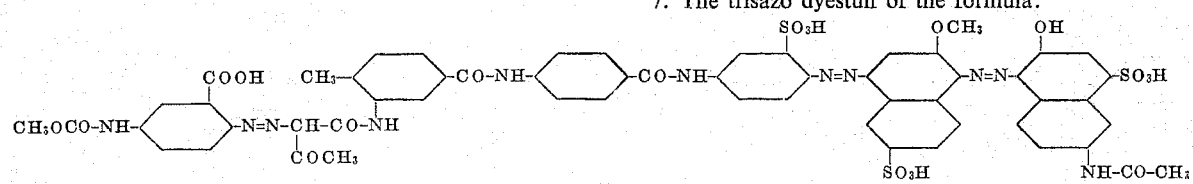

8. The trisazo dyestuff of the formula:

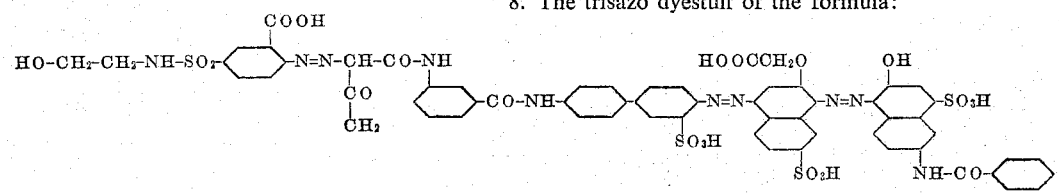

References Cited in the file of this patent

UNITED STATES PATENTS

| | | |
|---|---|---|
| 1,594,865 | Zitscher | Aug. 3, 1926 |
| 2,115,412 | Dahlen et al. | Apr. 26, 1938 |
| 2,515,546 | Bossard et al. | July 18, 1950 |

FOREIGN PATENTS

| | | |
|---|---|---|
| 367,675 | Great Britain | Feb. 25, 1932 |